No. 12,789. REISSUED MAY 5, 1908.

J. M. CONROY.

ORNAMENTING GLASS.

APPLICATION FILED FEB. 17, 1908.

4 SHEETS—SHEET 1.

WITNESSES:
Harvey L. Lechner
Archworth Martin

INVENTOR:
John M. Conroy
by atty
Paul C. Symmestredt

No. 12,789. REISSUED MAY 5, 1908.

J. M. CONROY.

ORNAMENTING GLASS.

APPLICATION FILED FEB. 17, 1908.

4 SHEETS—SHEET 2.

WITNESSES

Harvey L. Lechner

Archworth Martin

INVENTOR

John M. Conroy by atty

Carl Synnestvedt

No. 12,789. REISSUED MAY 5, 1908.

J. M. CONROY.

ORNAMENTING GLASS.

APPLICATION FILED FEB. 17, 1908.

4 SHEETS—SHEET 3.

WITNESSES

Harvey L. Lechner

Archworth Martin

INVENTOR

John M. Conroy by atty

Paul Synnestvedt

No. 12,789. REISSUED MAY 5, 1908.

J. M. CONROY.

ORNAMENTING GLASS.

APPLICATION FILED FEB. 17, 1908.

4 SHEETS—SHEET 4.

WITNESSES

Harvey L. Lechner

Archworth Martin

INVENTOR

John M. Conroy by atty

Paul Synnestvedt

UNITED STATES PATENT OFFICE.

JOHN M. CONROY, OF PITTSBURG, PENNSYLVANIA.

ORNAMENTING GLASS.

No. 12,789. Specification of Reissued Letters Patent. Reissued May 5, 1908.

Original No. 723,139, dated March 17, 1903, Serial No. 128,222. Application for reissue filed February 17, 1908. Serial No. 416,435.

*To all whom it may concern:*

Be it known that I, JOHN M. CONROY, a citizen of the United States, residing at Pittsburg, in the county of Allegheny and State of Pennsylvania, have invented or discovered certain new and useful Improvements in Ornamenting Glass, of which improvements the following is a specification.

The invention described herein relates to certain improvements in the art of shaping or producing an ornamental effect on the edges of glass articles, such as mirrors, &c., and has for its object the breaking away of removal of portions of the edges, more especially with reference to the production of inclined scallops or indentations along the edge of the article, said scallops being at an angle less than a right angle with the surfaces of the article.

The invention is hereinafter more fully described and claimed.

Figure 1:
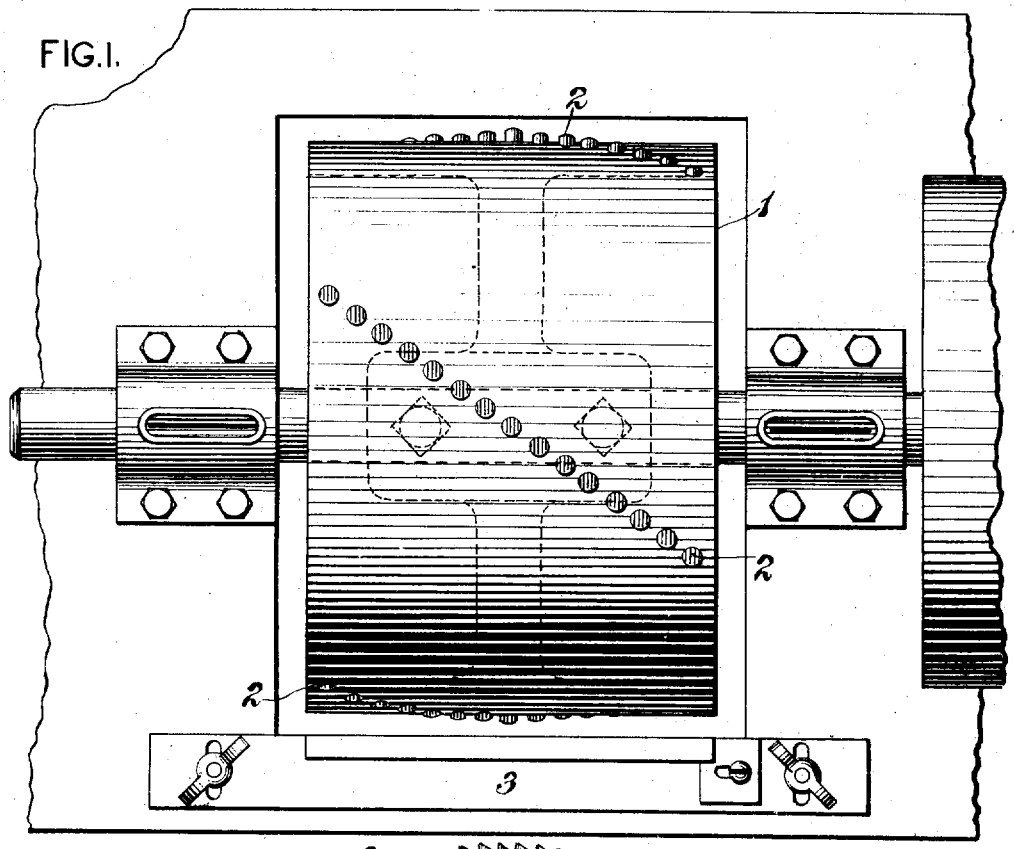
Figure 2:
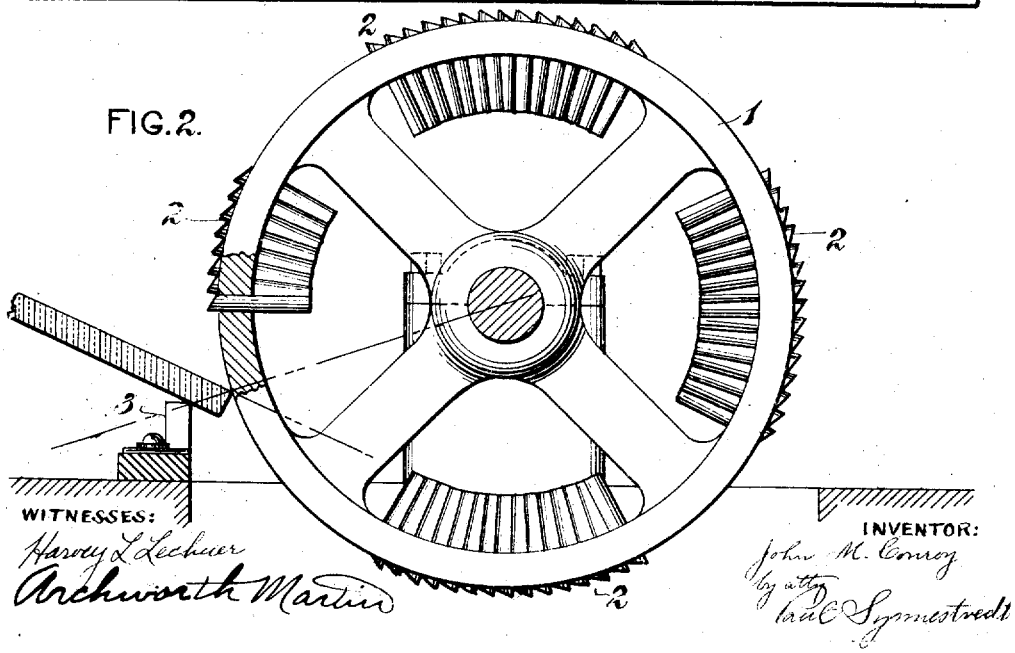
Figure 3:
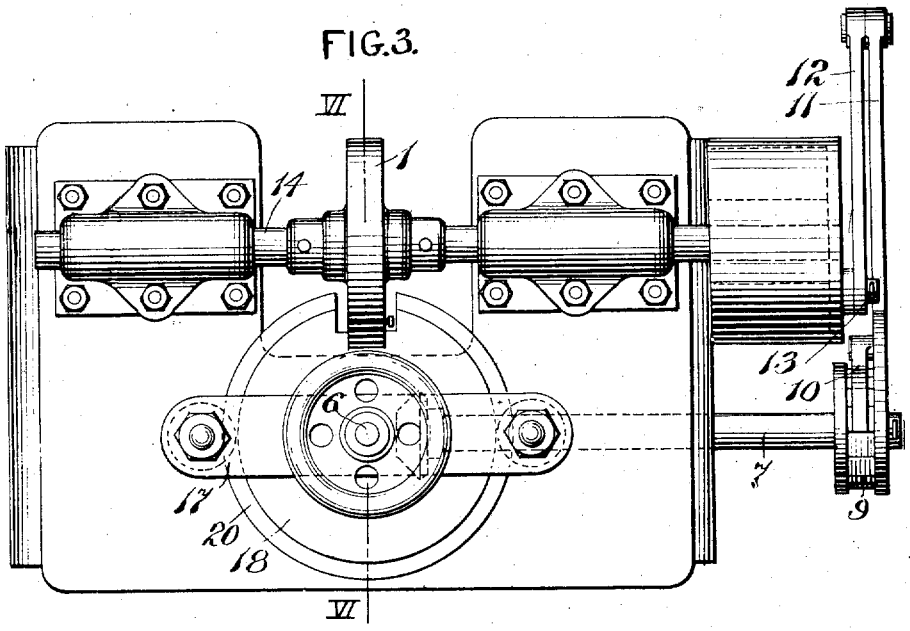
Figure 4:
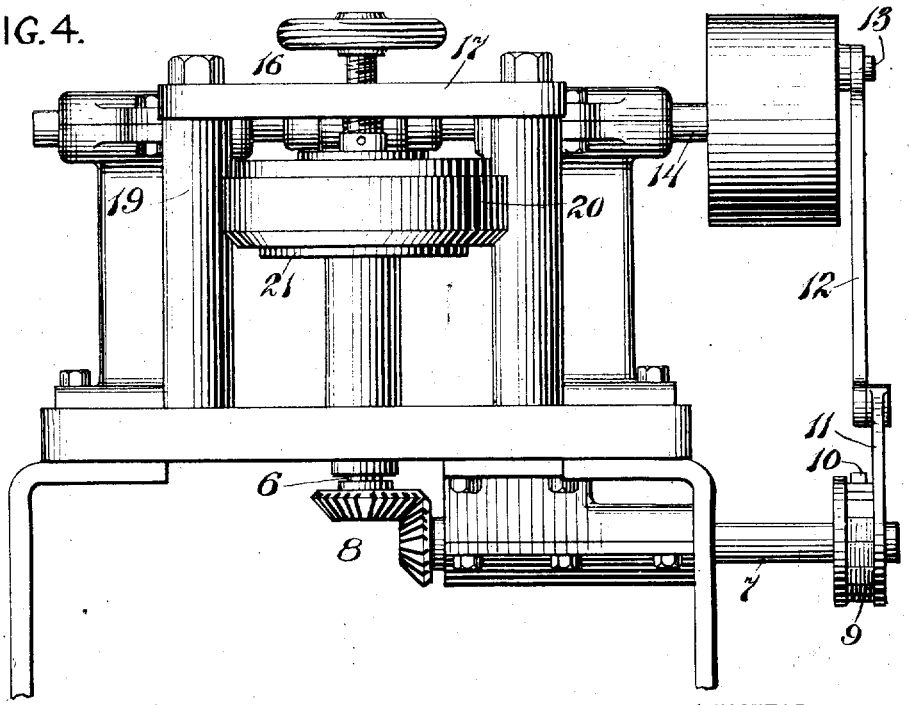
Figure 5:
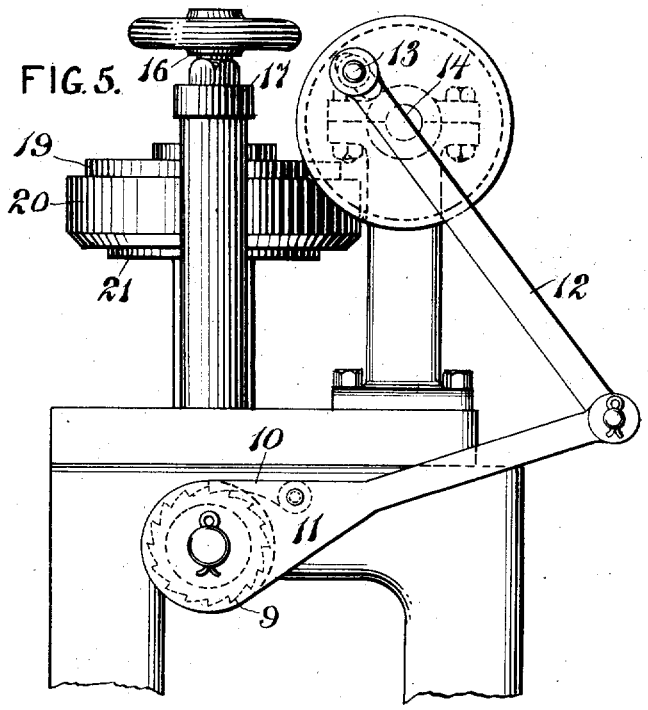
Figure 6:
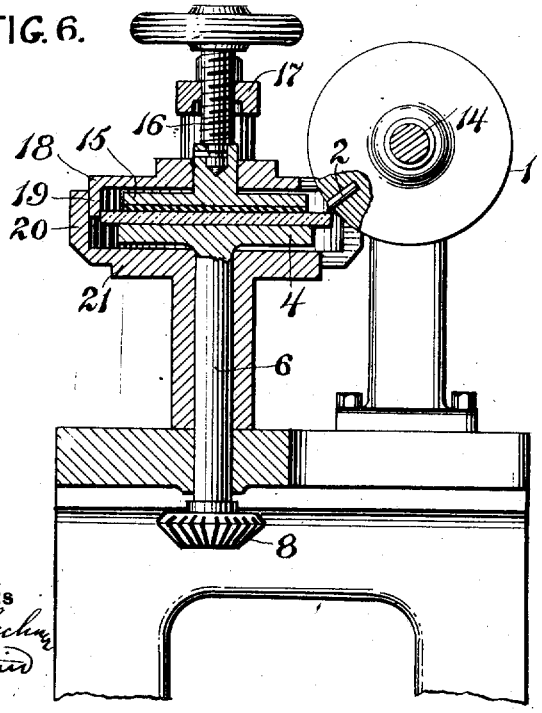
Figure 7:
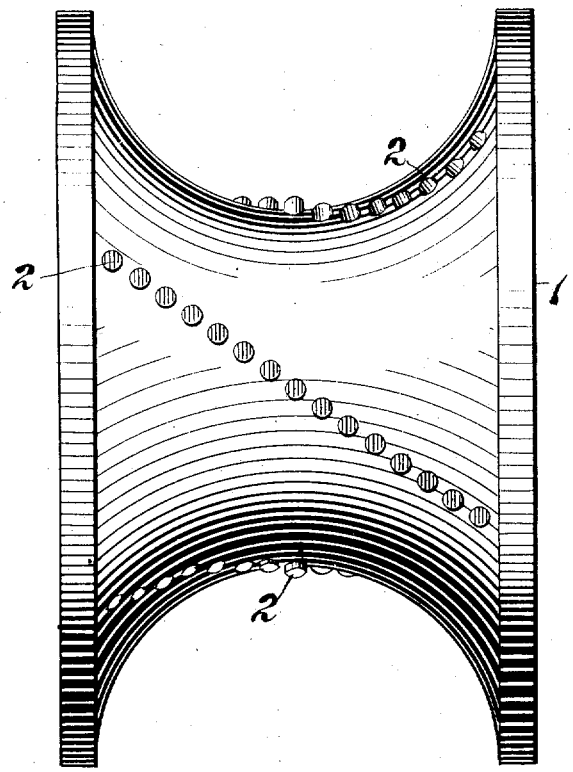
Figure 8:
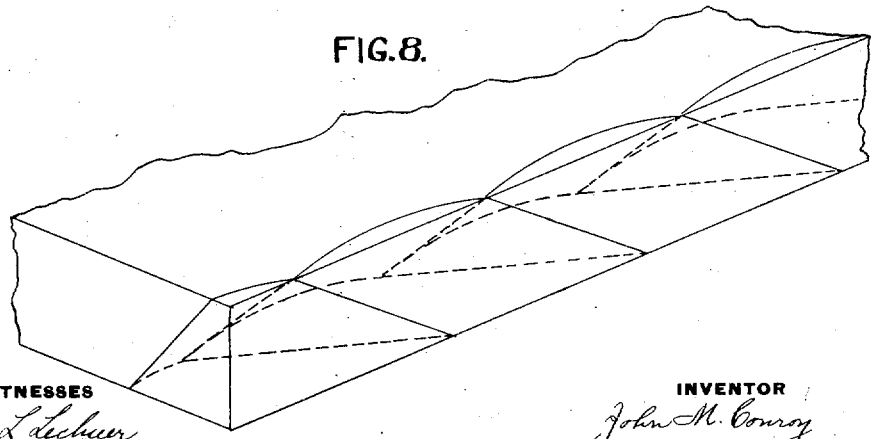

In the accompanying drawings, forming a part of this specification, Figure 1 is a plan view of a form of apparatus employed. Figure 2 is a sectional elevation of the same. Figure 3 is a plan view of another form of apparatus. Figs. 4 and 5 are front and side elevations of the same. Figure 6 is a sectional elevation. Figure 7 is an elevation illustrating a modification in the shape of the drum, and Figure 8 is a diagrammatic view illustrative of the fracture of the glass.

In the practice of my invention the glass is struck a sharp blow with a suitable tool at a point closely adjacent to its edge, the direction of impact being at an angle to the surface of the article. As the result of such a blow a piece of glass is so broken out from the edge and opposite side of the article as to leave a scallop extending at an angle from the edge on which the blow is struck, inwardly to a point some distance from the opposite edge. A series of scallops can be formed in like manner adjacent to each other, the width of the scallops being dependent upon the distance between the points at which the blows are struck and the regularity of the spacing of the blows. I have found that by evenly spacing the points of impact with the tool and making the blows uniform, or practically so, as to force, the pieces of glass removed are quite uniform in size and shape and that there is very little splintering of the glass. Except at and adjacent to the point of impact of the tool no sharp points or cutting edges are formed on the article, although such sharp points or edges are found in the pieces of glass removed.

A convenient form of apparatus for ornamenting straight edges is shown in Figs. 1 and 2 and consists of a power-driven carrier or drum 1, having a series of pins 2 projecting from its periphery, and a rest or support 3 for the glass. As shown, the pins are so arranged as to strike successively on the glass, as I have found that the best results are attained when an appreciable time elapses between successive blows. Such improved results incident to the time spacing of the blows are due, as I now believe, to the opportunity afforded for the recovery of the glass from the strains produced by one blow before being subjected to the next. As will be readily understood, the time interval can be had by spacing the pins farther apart and increasing the speed of the drum, or by placing the pins nearer together and decreasing the speed of the drum.

In Figures 1 and 2 I have shown my preferred form of construction of mechanism for ornamenting—*e. g.*, scalloping articles having straight edges. The drum 1 is made with a width of face at least equal to the length of the edge to be operated on, and one or more rows of pins 2 are secured in the periphery of the drum in such a manner that the pins will strike successively on the article. The spacing of the pins around the periphery will be dependent upon the peripheral speed of the drum, or the speed of the drum is regulated in accordance with the spacing of the pins, so that an opportunity may be afforded for the recovery of the glass from the strains produced by one pin before being subjected to the action of another pin. The diameter or width of the pins and their spacing across the face of the drum is regulated by the width of the scallop to be formed. One or more rows or series of pins may be used if the drum is rotated slowly, so that a number of edges may be operated on during each revolution of the drum. The rest-bar 3 is adjustably mounted on the frame of the machine and arranged, preferably, in such relation to the axis of the drums that the pins will be moving away from the bar or article resting thereon at the time of the impingement on the article. I have found that it is desirable that the rest-bar should present a firm and uniform support for the glass to prevent breakage of the articles. The article is held by the operator in such position that the pins will strike on the article closely adjacent to the edge at an angle of about 45° to the upper surface of the article, as clearly shown in Figure 2, and will move down and away from the article. In this movement the pin, which by preference should not strike much more than one-thirty-second of an inch from the edge of the article, does not merely nick the glass, but forces out a chip, the conoidal plane of fracture extending inwardly from the edge struck, at an angle of about forty-five degrees to the opposite face of the article, as shown in Figures 2 and 8. As before stated, the successive chips removed are substantially uniform in shape and size. In practice the operator presses the edge of the article against the periphery of the drum at the desired angle, the pins being set to project about a thirty-second of an inch from the periphery. It is preferred that the ends of the pins be beveled, as shown, to form a comparatively sharp striking edge and to permit the back edge of the pin to clear the edge of the article. The position of the bar or support 3 depends upon the thickness of the glass and should for best results be so adjusted that the line of support of the glass should coincide or be closely adjacent to the line where the plane of fracture intersects the under surface of the glass.

As shown in Figure 7, the periphery of the drum can be made to conform to the edge contour of the article; but it is preferred when operating on articles having curved edges to employ a construction similar to that shown in Figures 3 to 6. As shown therein, the drum is provided with a single pin and the article is secured on a table or bearing portion 4, which is shifted step by step to bring successive portions into the plane of movement of the pin 2. The table 4 is carried by a shaft 6, driven by the shaft 7 through the bevel gears 8. A ratchet-wheel 9 is secured to the shaft 7, and the pawl 10 is mounted on the arm 11, pivotally mounted on the shaft 7. The back-and-forth movement of the arm is effected through the link 12 by an eccentric-pin 13, carried by the shaft 14, on which the drum 1 is mounted. By this construction the table carrying the article will be moved forward a predetermined distance on each revolution of the drum and pin; such distance being proportional to the desired width of the scallops. In order to permit of carrying the feed of the table, the pin 13 is adjustably mounted, as shown in Figure 5. The article is clamped on the table by a plate 15, loosely mounted on a screw 16, passing through the cross-bar 17, secured to the frame of the machine. In order to insure that the axis of the plate 15 shall coincide with the axis of the table 4, a disk 18 is loosely mounted on the hub of the clamping plate 15 and is provided with a downwardly-projecting flange 19, which when the plate is screwed down passes inside of the rim 20 on the bed 21, which supports the table 4, as shown in Figure 6.

In lieu of the construction shown in Figures 3 to 6 the periphery of the drum may be given a contour the reverse of that of the article, as shown in Figure 7, and provided with pins spaced, as shown in Figures 1 and 2, with reference to successive action and arranged to impinge on the article at an angle of about forty-five degrees.

As the planes of fracture intersect the surface of the article at an approximately uniform distance from the edge of the article, my improved method may be employed as a preliminary step in beveling the edges of glass plates, and the major portion of the glass required to be removed to form the bevel can be chipped off very rapidly by my method, so that the comparatively slow removal by grinding would be neccessarily only for straightening and smoothing the bevel.

While I have shown with some particularity preferred forms of apparatus for carrying out my improved method, no claims are made herein to such specific or preferred forms of apparatus, as such specific or particular form of apparatus embodying a series or plurality of pins arranged to operate successively is claimed specifically in patent issued to me August 11, 1903, #735,949, and another specific or particular form embodying a supporting table for the glass and means for shifting the table step by step is specifically claimed in another patent issued to me June 23, 1903, #731,667.

The fundamental improvement above described is claimed in this application generically, as follows:

A machine for chipping the edges of glass articles, comprising in combination a rest or support for said article and a carrier movable relative to said support and provided with projecting means arranged to strike the said glass an angular glancing blow at a point adjacent its edge and in a direction away from the edge, substantially as described.

In testimony whereof I have hereunto signed my name in the presence of the subscribed witnesses.

JOHN M. CONROY.

Witnesses:
PAUL SYNNESTVEDT,
J. C. BRADLEY.